July 17, 1951 A. VAN DE WIEL 2,561,080

ELECTRIC CIRCUIT ARRANGEMENT

Filed May 20, 1950

INVENTOR
ALFRED VAN DE WIEL
BY
AGENT

Patented July 17, 1951

2,561,080

UNITED STATES PATENT OFFICE 2,561,080

ELECTRIC CIRCUIT ARRANGEMENT

Alfred van de Wiel, Eindhoven, Netherlands, assignor to Hartford National Bank and Trust Company, Hartford, Conn., as trustee Application May 20, 1950, Serial No. 163,270
In the Netherlands June 16, 1949

5 Claims. (Cl. 323—109)

This invention relates to a variable, phase-shifting bridge circuit comprising the series-combination of a transformer winding coupled to an alternating-voltage source, a variable inductance and a resistance. The voltage variable in phase is taken from a load connected between a tap on the transformer winding and the junction of the variable inductance and the resistance.

The load normally used is an inductance, for example a saturated transformer, which supplies peak voltages, or a resistance. Such bridge circuits are frequently used for supplying phase-variable ignition pulses for controllable gas- or vapour-filled discharge tubes.

The invention is based on recognition of the fact that a known circuit of the above described type may yield, by the use of relatively simple means, a considerably greater control range with respect to phase-shift, which is otherwise possible only with the use of a more complicated circuit-arrangement.

According to the invention, the load in a variable, phase-shifting bridge circuit of the aforesaid kind is for the greater part shunted by a condenser, preferably of such value that the total load is capacitive. This results in a considerably greater phase-shift.

The value of the condenser is preferably chosen to be such that the low current flowing through the inductance at an adjusted high value thereof is comparatively small and the high current flowing through the inductance at a low value thereof is comparatively great with respect to the current flowing through the condenser branch, this current being such that a phase shift of at least substantially 180° is obtainable. This is of particular importance for the control of discharge tubes, which may thus be controlled substantially from no-load to full load.

However, the capacitive load between the tap on the transformer and the junction between the variable reactance and the resistance, if the tap, as is usually the case, is provided at the center of the transformer winding, may have the disadvantage that the value of the voltage taken from this load and variable in phase is not always constant or substantially constant.

According to the invention, this disadvantage is mitigated by providing the said tap between the center of the transformer winding and the junction with the variable inductance. The said variation of the phase-variable voltage may be reduced to reasonable proportions by a suitable choice of this junction with respect to the other values of the circuit.

In order that the invention may be more clearly understood and readily carried into effect, it will now be described in detail with reference to the accompanying drawing, in which.

Figure 1:
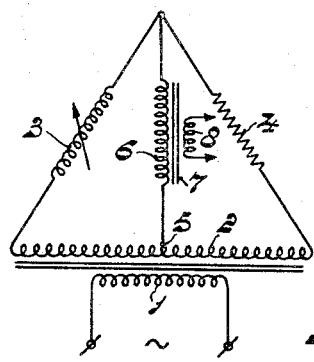
Fig. 1 is a schematic diagram of a prior art circuit arrangement.

In the known circuit shown in Fig. 1, the primary winding 1 of a transformer is connected to an alternating-current source, whereas the secondary winding 2 is included in a bridge circuit comprising the variable inductance 3 (for example, a choke premagnetized with the use of variable direct current) and a fixed resistance 4. The center 5 of the secondary winding 2 is connected through the primary winding 6 of a saturated transformer 7 to the junction between the inductance 3 and the resistance 4. The secondary winding 8 of transformer 7 may have taken from it peak voltages, the phase of which is variable, if the value of the inductance 3 is varied.

Figure 2:
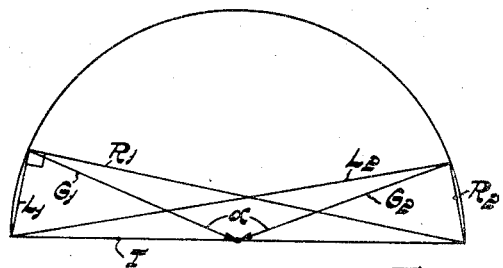
Fig. 2 is a vector diagram explanatory of the operation of the circuit in Fig. 1.

The vector diagram of this known circuit is shown in Fig. 2. If the value of the inductance 3 is low, so that the current flowing through it is comparatively high, the voltages across the inductance 3, the resistance 4 and the primary winding 6 of Fig. 2 are represented by $L_1$, $R_1$ and $G_1$ respectively, where T represents the voltage across the secondary winding 2 of the supply transformer.

If, on the other hand, the inductance 3 is adjusted to a high value, so that the current traversing it is low, the vector diagram will be chaged to the figure formed by the voltage $L_2$ across the inductance 3, $R_2$ across the resistance 4 and the voltage $G_2$ across the secondary winding 6. The voltage $G_2$ required for control purposes is thus turned through a phase angle $a$. Since the variable values of the inductance 3 lie within certain limits to ensure an economic construction, the angle $a$ cannot in practice approach 180°. In practice an angle $a$, for example from 130 to 140° will be attainable.

Figure 3:
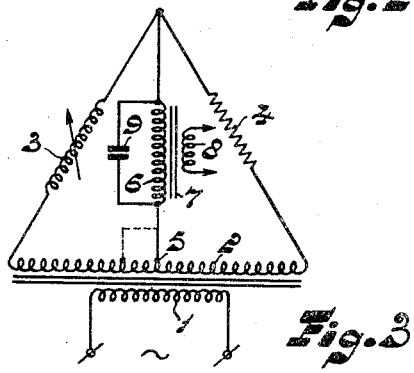
Fig. 3 is a schematic diagram of one preferred embodiment of a circuit in accordance with the invention.

As shown in Fig. 3, the primary winding 6 of the transformer 7 is shunted, according to the invention, by a condenser 9. The value of the condenser is chosen to be such that the total load 6, 9 is capacitive and the current flowing through this load branch is several times higher than the smallest current flowing through the inductance 3, adjusted to the maximum value, and several times lower than the highest current flowing through the inductance 3, adjusted to the minimum value.

At a low value of the inductance 3, consequently with a great current flow, the comparatively low current flowing through the condenser may be substantially neglected, which results in a vector diagram substantially corresponding to $L_1$, $R_1$ and $G_1$ of Fig. 2.

Figure 4:
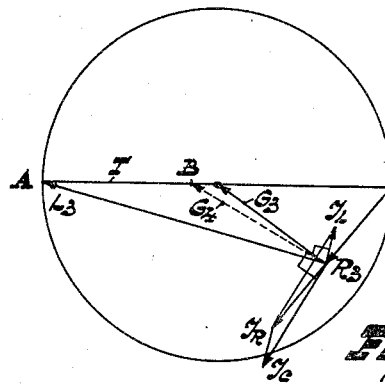
Fig. 4 is a vector diagram explanatory of the circuit in Fig. 3.

If a small current flows through the inductance 3, the current flowing through the condenser branch is several times higher. The components of the circuit are so proportioned that, for example, a current diagram is obtained as shown in Fig. 4, in which $I_L$ designates the current flowing through the inductance 3, $I_R$ the current flowing through the resistance 4, and $I_C$ the current flowing through the branch 6, 9. The voltage $R_3$ across resistance 4 is in phase with the current $I_R$, the voltage $L_3$ across the inductance leads by 90° with respect to the current $I_L$ and the voltage $G_3$ across the condenser lags by 90° with respect to the current $I_C$. From Figs. 2 and 4 it may readily be seen that the voltage $G_3$ across the load 6, 9 is shifted in phase more than 180° with respect to the voltage $G_1$.

Fig. 4 furthermore shows, however, that the value of the vector $G_3$ is comparatively much smaller than half the voltage across the transformer winding 2, i. e. the radius of the circle. Since it is frequently desirable, for example for the ignition of discharge tubes, that the voltage $G_3$ should have a higher value—since failure-free ignition must be ensured just in the proximity of the 180° phase-shifted voltage—it is in such cases advisable that the tap 5 on the secondary winding 2 of Fig. 3 should be displaced more to the side of the inductance 3 (as shown by a dotted line). The vector $G_3$ of Fig. 3 then occupies the position indicated by $G_4$ and has a value approximately equal to the voltage AB, i. e. slightly smaller than the radius of the circle, the vector diagram being varied only slightly.

At a voltage of 110 volts across the secondary winding 2 of a circuit constructed in practice, the voltage on the left-hand side of the tapping was 45 volts and that on the right-hand side of this point was 65 volts.

What I claim is:

1. A variable phase-shifting bridge circuit comprising a transformer, means to apply an alternating-current to said transformer, a variable inductance, a resistance connected in series with said inductance across said transformer, a load impedance connected between an intermediate point on a winding of said transformer and the junction of said resistance and inductance, a condenser shunted across a portion of said load impedance and having a value at which the resultant impedance is capacitive, and means to derive a voltage variable in phase from said load impedance.

2. An arrangement, as set forth in claim 1, wherein said condenser has a value at which the low current flow through said inductance at an adjusted high value thereof is low relative to the current flowing through said condenser and the heavy current flow through said inductance at an adjusted low value thereof is high relative to the current flowing through said condenser, the condenser current being such that a phase-shift of at least substantially 180° is obtainable.

3. An arrangement, as set forth in claim 1, wherein said intermediate point is at a point between the center of said secondary winding and the junction of said winding and inductance.

4. A variable phase-shifting bridge circuit comprising a first transformer, a source of alternating current connected to said transformer, a variable inductance, a resistance connected in series with said inductance across said transformer, a saturated output transformer having a winding connected between a tap on said first transformer and the junction of said inductance and resistance, and a condenser shunted across said winding of said output transformer.

5. An arrangement, as set forth in claim 4, wherein said variable inductance is constituted by a choke having a premagnetization winding, means to apply a direct voltage to said premagnetization winding and means to vary the magnitude of said direct voltage thereby to vary the value of said choke.

ALFRED VAN DE WIEL.

No references cited.